US006512983B1

(12) United States Patent
Bauer et al.

(10) Patent No.: US 6,512,983 B1
(45) Date of Patent: Jan. 28, 2003

(54) METHOD FOR DETERMINING THE CONTROLLER OUTPUT FOR CONTROLLING FUEL INJECTION ENGINES

(75) Inventors: Hartmut Bauer, Gerlingen (DE); Dieter Volz, Heilbronn (DE); Juergen Gerhardt, Oberriexingen (DE); Juergen Pantring, Schwieberdingen (DE); Michael Oder, Illingen (DE); Werner Hess, Stuttgart (DE); Christian Koehler, Erligheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/830,872

(22) PCT Filed: Nov. 2, 1999

(86) PCT No.: PCT/DE99/03479

§ 371 (c)(1),
(2), (4) Date: May 2, 2001

(87) PCT Pub. No.: WO00/26522

PCT Pub. Date: May 11, 2000

(30) Foreign Application Priority Data

Nov. 3, 1998 (DE) ........................................ 198 51 990

(51) Int. Cl.[7] ................................................ G06F 3/00

(52) U.S. Cl. ............................ 702/41; 702/45; 702/85; 702/105; 702/113

(58) Field of Search ............................ 702/41, 85, 105, 702/33, 45, 50, 55, 113, 114, 138, 140, 182, 184, 188; 123/399, 295

(56) References Cited

U.S. PATENT DOCUMENTS

| | | | | |
|---|---|---|---|---|
| 5,479,898 A | | 1/1996 | Cullen et al. | 123/350 |
| 6,205,973 B1 | * | 3/2001 | Bauer et al. | 123/294 |
| 6,273,076 B1 | * | 8/2001 | Beck et al. | 123/679 |
| 6,308,697 B1 | * | 10/2001 | Surnilla et al. | 123/672 |
| 6,386,180 B1 | * | 5/2002 | Gerhardt et al. | |

FOREIGN PATENT DOCUMENTS

| | | |
|---|---|---|
| DE | 196 18 849 | 11/1997 |
| WO | WO/95/24550 | 9/1995 |

* cited by examiner

*Primary Examiner*—Marc S. Hoff
*Assistant Examiner*—Felix Suarez
(74) *Attorney, Agent, or Firm*—Walter Ottesen

(57) ABSTRACT

A method for adjusting the torque in an internal combustion engine is introduced having the steps: determining a desired torque; determining an operating point from measured values for air charge and rpm; determining a standard torque for this operating point; determining a desired efficiency from standard torque and desired torque; determining the lambda corresponding to this efficiency; determining the fuel quantity from the corresponding lambda and the air charge derived from measurement quantities. The fuel quantity in combination with the air charge yields the corresponding lambda for realizing the desired torque.

2 Claims, 3 Drawing Sheets

METHOD FOR DETERMINING THE CONTROLLER OUTPUT FOR CONTROLLING FUEL INJECTION ENGINES

FIELD OF THE INVENTION

The invention relates to the adjustment of a desired engine torque by appropriate computation of the actuating variables especially for adjusting the air supply and the fuel supply to the engine in an engine having gasoline direct injection.

BACKGROUND OF THE INVENTION

An important operating mode of an engine having gasoline direct injection is the approximately unthrottled operation with high air excess. The air mass in the combustion chamber is then substantially constant and the excess-air factor (lambda) as an index for the composition of the air/fuel mixture is determined by the injected fuel mass. The air mass in the combustion chamber, in combination with lambda and the rpm n, determines the torque developed by the engine. At high air excess, the desired torque can be adjusted for the most part via a variation of the fuel quantity. The combustibility of the mixture with high air excess is achieved by a spatially non-homogeneous mixture distribution. This mode of operation is characterized as stratified operation. In contrast to stratified operation, the operation with a homogeneous mixture distribution is without air excess or only with a slight air excess. The invention relates to the determination of actuating quantities in dependence upon the requested torque during stratified operation.

External requirements on the intake manifold pressure during stratified operation affect the air charge. Such requirements result, for example, from the situation that the exhaust-gas return and the tank venting require a certain pressure drop. The request which brings about the lowest intake manifold pressure is realized by a minimum selection and intervention into the throttle flap position.

If one leaves the fuel quantity, which is to be injected for a desired torque, unchanged, then lambda changes. This has unwanted torque changes as a consequence.

SUMMARY OF THE INVENTION

The task of the invention is to avoid the unwanted torque changes.

Advantageously, the determination of the actuating quantity "injection time" is supplemented by a determination of the actuating quantity of the air supply.

In this way, the further task is solved, namely, to obtain an appropriate adjustment of the fuel supply and air supply to the engine to realize a pregiven engine torque while considering a maximum permissible value for the air number lambda.

This further task is solved by a supplemental limiting of the air supply to maximum values. This limitation guarantees the reproducible adjustment of low torques over a variation of injection pulsewidths. Without this limitation, an unwanted adjustment to too lean a mixture can result which could present problems with respect to the combustibility of the mixture and/or the exhaust-gas emissions.

BRIEF DESCRIPTION OF THE DRAWINGS

In the following, an embodiment of the invention will be explained with respect to the figures.

DESCRIPTION OF THE PREFERRED EMBODIMENTS OF THE INVENTION

Figure 1:
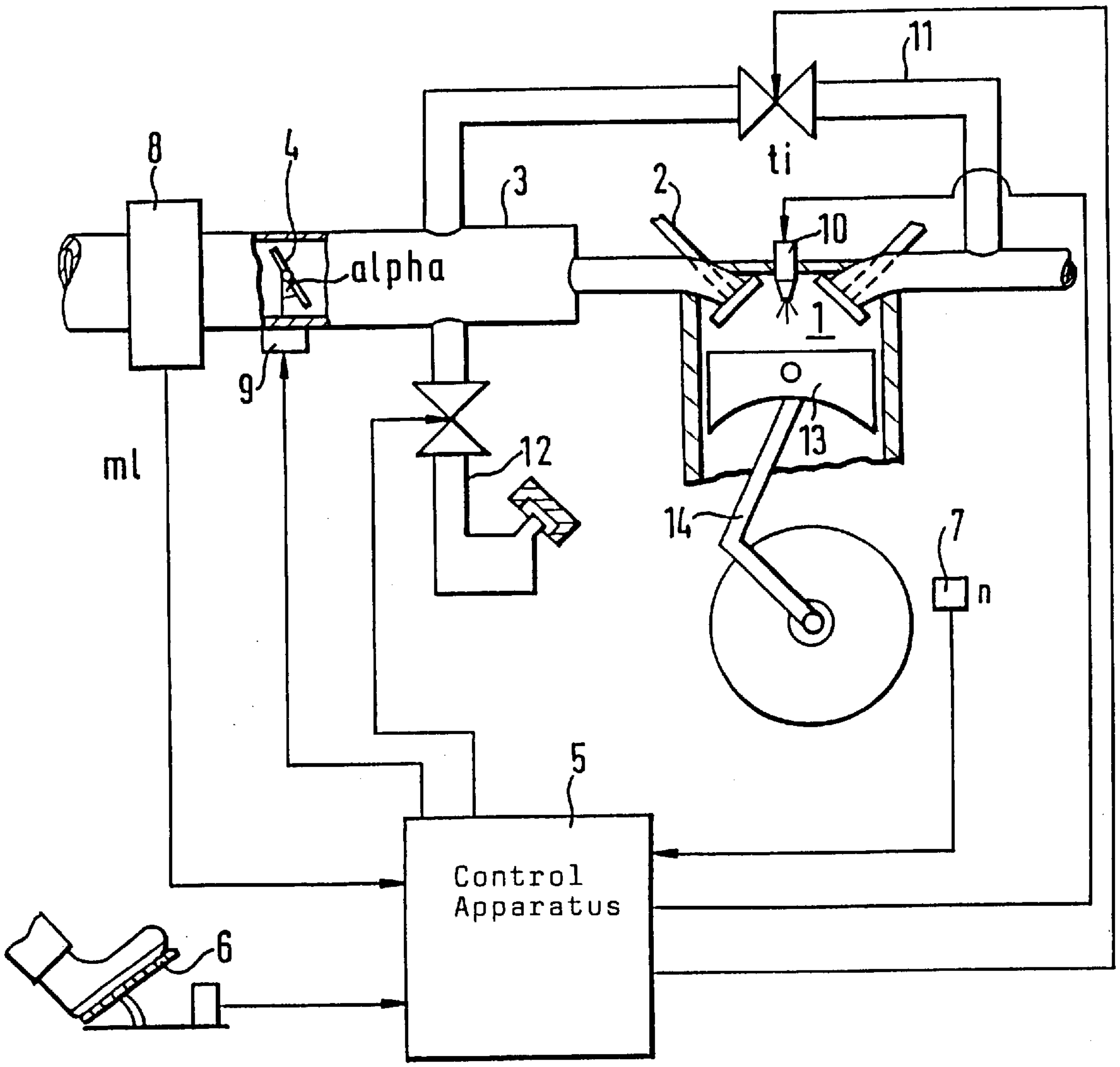
FIG. 1 shows the technical background of the invention.

Reference numeral 1 in FIG. 1 represents the combustion chamber of a cylinder of an internal combustion engine. The inflow of air to the combustion chamber is controlled via an inlet valve 2. The air is drawn by suction via an intake manifold 3. The inducted air quantity can be varied via a throttle flap 4 which is controlled by the control apparatus 5. Signals as to the torque demand of the driver are supplied to the control apparatus, for example, in accordance with the position of an accelerator pedal 6; a signal as to the engine rpm (n) is transmitted to the control apparatus from an rpm transducer 7 and a signal is supplied as to the quantity ml of the inducted air by an air quantity sensor 8. The control apparatus 5 forms output signals from these signals and, if required, further input signals concerning additional parameters of the engine such as intake air temperature and coolant temperature. The output signals are for adjusting throttle flap angle alpha via an adjusting element 9 and for driving a fuel injection valve 10 via which fuel is metered into the combustion chamber of the engine. The throttle flap angle alpha and the injection pulsewidth ti are viewed in the context of the invention as essential actuating variables for realizing the desired torque and these actuating variables are to be matched to each other. Furthermore, the control apparatus controls, if required, an exhaust-gas recirculation 11 and a tank venting 12 as well as other functions such as the ignition of the air/fuel mixture in the combustion chamber. The gas force, which results from the combustion, is converted by piston 13 and crank drive 14 into a torque.

Figure 2:
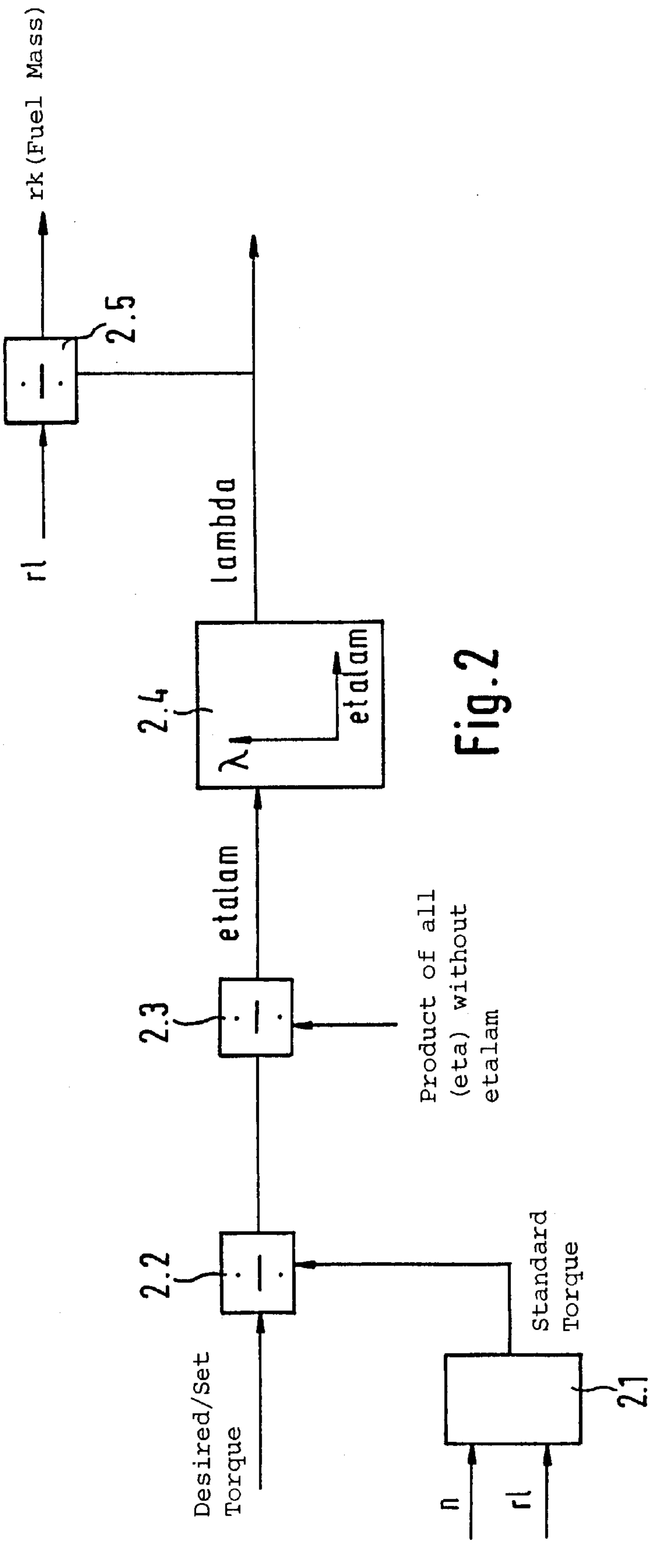
FIG. 2 discloses an embodiment of the invention in the form of function blocks; and, FIG. 3 defines the formation of the limiting of the air supply.

FIG. 2 shows an embodiment of the invention. Block 2.1 defines a characteristic field which is addressed via the rpm (n) and the relative air charge rl. The relative air charge is referred to a maximum charge of the combustion chamber with air and indicates, to a certain extent, the fraction of a maximum combustion chamber or cylinder charge. The air charge is formed essentially from the signal ml. The relative charge rl formed from measured quantities and the rpm (n) define an operating point of the engine. Torques are assigned to various operating points with the characteristic field 2.1 and the engine generates these torques under standard conditions at the various operating points.

Standard conditions are determined by specific values of influence quantities such as ignition angle, air number lambda, EGR rate, tank venting condition, et cetera. As a standard condition with respect to the air number, lambda=1 is pertinent. As a standard condition with respect to the ignition angle, that ignition angle can be defined at which the maximum possible torque is adjusted.

With respect to each influence quantity, an efficiency eta can be defined as a ratio of the torque under standard conditions to the torque which is adjusted for an isolated change of the influence quantity.

For deviations of several influence quantities from their standard values, the product of the efficiencies yields the ratio of the standard torque at the standard values of the influence quantity to the torque at the deviating influence quantities.

Stated otherwise, desired torque/standard torque=product of the efficiencies. The division of the wanted or desired torque (which is dependent, for example, on the driver command) divided by the standard torque (which is determined for the individual operating point) in block 2.2 therefore supplies the product of all efficiencies.

The values of the influence quantities such as EGR rate, ignition angle, et cetera, are present in the control apparatus. For example, with the aid of stored characteristic lines, the corresponding efficiencies are determined. The formation of the product of the efficiencies of the known influence quantities follows. These are all influence quantities except lambda.

The division of the product of all efficiencies by the product of the efficiencies of the known influence quantities in block 2.3 supplies the lambda efficiency etalam.

From this lambda efficiency etalam, the corresponding lambda is determined in block 2.4, for example, via a characteristic line intervention.

For various lambda values, the characteristic line eta of lambda yields the ratio of the standard torque at lambda=1 to the torque at other lambda values.

Block 2.4 thereby supplies precisely that lambda value which must be adjusted in the combustion chamber in order to induce the desired torque in the actual operating point, which is defined by the air charge rl and the rpm (n), for the known remaining influence quantities such as ignition time point, EGR rate, et cetera. In this connection, inducing here means the generation of the gaseous force which delivers the desired torque via piston and crank drive.

This desired lambda value, in combination with the air charge rl of the combustion chamber derived from measurement quantities, determines the fuel quantity which must be injected to generate the desired torque.

From this, a relative fuel mass can be determined in block 2.5 by dividing rl by the lambda desired value determined in dependence upon the desired torque. This fuel mass is then converted into the specific injection pulsewidth as an actuating quantity in the fuel path.

This embodiment makes possible an adjustment of the desired torque in the substantially dethrottled stratified operation of the engine.

Figure 3:
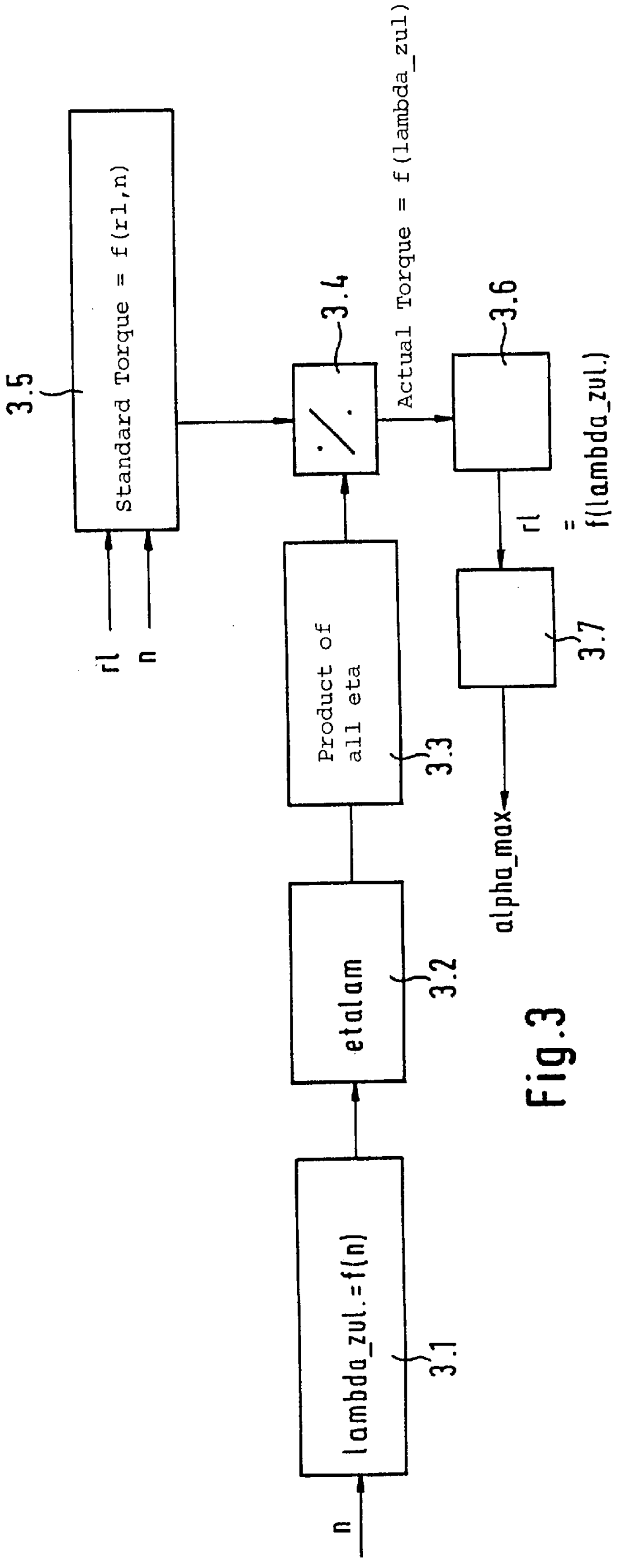

The supplement shown in FIG. 3 makes possible the appropriate adjustment of fuel supply and air supply to the engine to realize a pregiven engine torque while considering a maximum permissible value for the air number lambda.

Without the last condition, it could happen that an unwanted adjustment takes place to a mixture which is too lean and which could bring with it problems in the combustibility of the mixture and/or in the exhaust-gas emissions.

The above is so because the torque increases for a fixed lambda with increasing cylinder charge. If a variable lambda is permitted, then a certain bandwidth of adjustable torques results for a fixed charge. The bandwidth is pregiven by lambda limit values outside of which, for example, the combustibility is not ensured.

For this reason, there is a minimum torque for each charge. If smaller torques are wanted, then this cannot any longer be realized exclusively via an intervention into the fuel path. Rather, a reduction of the charge is then absolutely necessary.

According to the invention, the appropriate air charge and fuel mass are adjusted which will supply this pregiven desired torque in stratified operation for a specific pregiven desired torque while considering a maximum permissible lambda value.

The air charge can, for example, be adjusted via the throttle flap opening angle as an actuating variable, for example, in systems having electronically controlled throttle flaps (EGAS). The computation of this actuating variable takes place in the so-called air path.

The fuel mass is, for example, adjusted via the variation of an injection pulsewidth as an actuating variable. The computation of this actuating variable takes place as shown above in the so-called fuel path.

The actual adjustment of the engine torque takes place, as described, with the aid of the fuel path.

In the air path, and as a supplement, a limiting of the charge takes place to values which correspond to torques which are adjustable via the fuel metering. Stated otherwise, in the air path, the cylinder charge is limited to a value which results from the maximum permissible lambda for the desired torque.

This is shown in FIG. 3. In block 3.1, first the maximum permissible lambda value lambda_zul is determined which can, for example, be dependent upon the rpm (n) and can therefore be determined, for example, from a characteristic line.

The corresponding lambda efficiency etalam is determined in block 3.2 from this maximum permissible lambda.

For known remaining influence quantities, the product of all efficiencies for the maximum permissible lambda can be determined in the block 3.3.

This product corresponds to the ratio of command or actual torque to the torque under standard conditions as explained above. For this view, which proceeds from a maximum permissible lambda value, this actual torque corresponds to the torque which is adjusted for the maximum permissible lambda. This actual torque is assignable to the maximum permissible lambda value and is generated in block 3.4 via a logic coupling of the product of the efficiencies with the standard torque made available by block 3.5.

A maximum cylinder charge rl=f(lambda_zul) can be clearly assigned to this specific actual torque via a characteristic line intervention in block 3.6. At this maximum cylinder charge, the specific actual torque adjusts while assuming a maximum lambda, that is, a lambda at the lean operating limit between mixtures which are just combustible and just no longer combustible.

This air charge rl defines the upper charge limit below which the desired torque can be realized alone by intervention in the fuel path.

This charge limit can be realized via a limiting of the opening angle of the throttle flap to a maximum value alpha_max in block 3.7.

What is claimed is:

1. A method for adjusting the torque in an internal combustion engine to which an air charge is supplied, the method comprising the steps of:

determining a desired torque;

determining an operating point from measured values for said air charge and engine rpm;

determining a standard torque for this operating point;

determining a desired efficiency from said standard torque and a desired torque;

determining the lambda corresponding to this efficiency; and, determining the fuel quantity from the corresponding lambda and the air charge derived from measurement quantities, which fuel quantity, in combination with the air charge, yields the corresponding lambda for realizing the desired torque.

2. The method of claim 1, the method comprising the further steps of:

determining the maximum permissible lambda value for a regular combustion;

determining the corresponding lambda efficiency;

determining the total efficiency as a product of all efficiencies of the remaining known influence quantities for the maximum permissible lambda;

determining the actual torque which adjusts for the maximum permissible torque and the efficiencies while considering the standard torque;

determining a maximum cylinder charge rl at this actual torque whereat this actual torque is adjusted while assuming a maximum lambda;

determining a maximum throttle flap angle alpha_max for limiting the charge.

* * * * *